United States Patent
Thornton

(10) Patent No.: US 6,475,268 B2
(45) Date of Patent: Nov. 5, 2002

(54) SUPPORTED MEMBRANE FOR HYDROGEN SEPARATION

(75) Inventor: Peter Howard Thornton, Dearborn, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 19 days.

(21) Appl. No.: 09/745,999

(22) Filed: Dec. 22, 2000

(65) Prior Publication Data

US 2002/0078827 A1 Jun. 27, 2002

(51) Int. Cl.[7] ............................ B01D 53/22; B01D 71/02
(52) U.S. Cl. .................... 96/11; 95/56; 55/524; 55/DIG. 5
(58) Field of Search ........................ 95/55, 56; 96/4, 96/11; 55/524, DIG. 5

(56) References Cited

U.S. PATENT DOCUMENTS

| | | | | |
|---|---|---|---|---|
| 3,247,648 A | * | 4/1966 | McKinley | 95/56 |
| 3,350,846 A | * | 11/1967 | Makrides et al. | 95/56 |
| 3,439,474 A | * | 4/1969 | McKinley | 95/56 |
| 4,496,373 A | | 1/1985 | Behr et al. | 55/158 |
| 4,699,637 A | | 10/1987 | Iniotakis et al. | 55/16 |
| 5,614,001 A | * | 3/1997 | Kosaka et al. | 95/55 X |
| 5,645,626 A | | 7/1997 | Edlund et al. | 95/56 |
| 5,782,960 A | * | 7/1998 | Ogawa et al. | 95/56 X |
| 5,904,754 A | | 5/1999 | Juda et al. | 96/11 |
| 5,931,987 A | * | 8/1999 | Buxbaum | 95/55 |
| 5,989,319 A | * | 11/1999 | Kawae et al. | 95/56 X |
| 6,066,592 A | * | 5/2000 | Kawae et al. | 95/56 X |
| 6,152,987 A | * | 11/2000 | Ma et al. | 95/56 |
| 6,152,995 A | * | 11/2000 | Edlund | 95/56 X |

FOREIGN PATENT DOCUMENTS

| | | | | |
|---|---|---|---|---|
| JP | 53-043153 | * | 11/1978 | 95/56 |
| JP | 01-262903 A | * | 10/1989 | 96/11 |
| JP | 03-052630 A | * | 3/1991 | 96/4 |

* cited by examiner

Primary Examiner—Robert H. Spitzer
(74) Attorney, Agent, or Firm—Damian Porcari

(57) ABSTRACT

A supported membrane for separation of hydrogen in a fuel cell includes a microetched foil to form a substrate. The supported membrane also includes a membrane metal of a metal alloy deposited over the substrate to form a thin metal supported membrane for hydrogen separation.

18 Claims, No Drawings

SUPPORTED MEMBRANE FOR HYDROGEN SEPARATION

BACKGROUND OF THE INVENTION

1. Field of the Invention

The present invention relates generally to membranes and, more specifically, to a supported membrane for hydrogen separation.

2. Description of the Related Art

Development of the electric vehicle has recently undergone increased activity in an effort to reduce air pollution and conserve fuel resources. A major stumbling block in the development of electric vehicles has been developing a suitable means of supplying power for the electrical drive motors. In most instances, the power has been supplied from a battery source. However, the current battery technology is not capable of supplying a sufficient amount of energy to power the vehicle over extended distances.

Fuel cells have recently been examined as an alternative power source for electrical vehicles. A fuel cell is a demand-type power system in which the fuel cell operates in response to the load imposed across the fuel cell. Typically, a liquid hydrogen-containing fuel (e.g., gasoline, methanol, diesel, naphtha, etc.) once converted to a gaseous stream that contains hydrogen serves as the fuel supply for the fuel cell. Converting the liquid fuel (like methanol or gasoline) to a gas containing hydrogen takes place when the fuel is passed through a fuel reformer. In a fuel reformer, the liquid fuel reacts with steam. The gas formed includes hydrogen gas (20–75% depending on the liquid fuel) and usually contains other passivating gas species such as carbon monoxide, carbon dioxide, methane, water vapor, oxygen, nitrogen, unburned fuel and, in some cases, hydrogen sulfide. An oxidant, usually air, is supplied to the fuel cell to react with the hydrogen gas produced to produce electric current. The electric current can then be drawn on demand in response to loads across the fuel cell to power electrical devices, such as an electric motor of an electric vehicle.

For the fuel cell to generate electric current, however, the hydrogen gas must first be separated from the other gases formed by the fuel reformer. The hydrogen gas atom is very small and it can diffuse through some metals, whereas the other gases have relatively large molecules and so are blocked from passing through. Palladium membranes (i.e., films) are widely used for hydrogen gas separation in the chemical industry. However, palladium is very expensive, and the supported membranes could be made less expensive by using a palladium alloy.

Currently, supported membranes for hydrogen separation are made by rolling a very thin sheet of metal onto a wire mesh support. The method is limited to pure palladium as the membrane metal because cheaper palladium alloys or other metals, e.g. vanadium, are too hard and will not bond to the wire mesh. In addition, very thin sheets of metals, which are free from defects such as holes, are difficult to obtain. Because of the complex structure of the wire mesh/membrane metal, it is difficult to get a good vacuum seal at the edge of thereof. Therefore, there is a need in the art to provide thin supported membranes to reduce the use of expensive metals for separation of hydrogen.

SUMMARY OF THE INVENTION

Accordingly, the present invention is a supported membrane for separation of hydrogen in a fuel cell including a microetched foil to form a substrate. The supported membrane also includes a membrane metal of a metal alloy deposited over the substrate to form a thin metal supported membrane for hydrogen separation.

The present invention is also a method of making a thin metal supported membrane useful as a diaphragm in fuel reformers for separating hydrogen from other gaseous products of a reforming reaction. The method includes the steps of providing a substrate comprising a microetched foil. The method also includes the steps of depositing a membrane metal of a metal alloy onto the substrate to form a thin metal supported membrane for hydrogen separation.

One advantage of the present invention is that a supported membrane is provided for hydrogen separation in a fuel cell. Another advantage of the present invention is that a method is provided to make a very thin supported membrane (<10 micrometer thick), which can withstand significant temperatures and pressures (300° C. and 150 psi) in a fuel cell. Yet another advantage of the present invention is that the supported membrane can be composed of a variety of metals that are permeable to hydrogen and which may be alloys.

Other features and advantages of the present invention will be readily appreciated as the same becomes better understood, after reading the subsequent description.

DESCRIPTION OF THE PREFERRED EMBODIMENT(S)

One embodiment of the present invention is a supported membrane, according to the present invention, for hydrogen separation and involves manufacturing the supported membrane of a metal alloy such as palladium/copper or vanadium/copper metal. A method, according to the present invention, includes the steps of a providing a substrate comprising a microetched foil and depositing a membrane metal of a metal alloy onto the substrate to form a thin metal supported membrane for hydrogen separation. This and other aspects of the present invention are discussed in detail below.

In the present invention, a thin metal supported membrane or film is made by depositing, such as by evaporating from a melt or by sputtering from a solid, a membrane metal onto a microetched foil of a metal material. The metal material of the foil can be stainless steel. These foils contain a large number of closely spaced, e.g. 150 micrometer, small diameter, e.g. 50 micrometer, holes. To provide a substrate so that the holes in the foil may be covered by the deposit, a layer or sheet of replicating film or solvent soluble parting material is attached to the back of the foil. The replicating film has a predetermined thickness such as 35 micrometers. Replicating films are well known in the art. Cellulose acetate is one example of a replicating film and is attached to the foil by placing the foil on a paper towel, wetting the foil and towel with acetone, for example, and then pressing the replicating film onto the foil. It should be appreciated that other suitable replicating materials could also be used and applied in any way.

In the present invention, the front of the foil is deposited or coated with a membrane metal in the usual or conventional way. The membrane metal is a metal alloy, preferably a palladium/copper (Pd/Cu) alloy or a vanadium/copper (V/Cu) alloy. The substrate, e.g. the foil and replicating film, is then mounted in a vacuum chamber of a sputtering equipment system (not shown) or of an evaporating system. Sputtering techniques are well known in the art. It is a process by which a substance may be deposited as a thin film on a substrate in a low-pressure gas, typically a few mTorr to 100 mTorr, which provides a medium in which a glow discharge can be maintained. General sputtering techniques are discussed, for example, in Thin Film Processes, ed. John L. Vossen and Werner Kern, Academic Press, New York, 1978 which is hereby expressly incorporated by reference for its teachings. In one exemplary sputtering system of the present invention, a dual beam system is used in which the substrate was mounted parallel to, but less than 10 cm from a palladium/copper alloy source. It should be appreciated that a supported membrane of 60/40 Pd/Cu is particularly useful in the present invention for use in a fuel cell.

Alternatively, the layer of membrane metal can be formed by first depositing a layer of copper followed by the other alloying metal. Because of the three dimensional nature of the structure, the major difficulty is to get an initial complete coverage of the holes. This can be accomplished by depositing the initial copper layer in several increments of, e.g. ¼ micrometer, and repositioning the foil in its mount in the evaporating or sputtering chamber in between each deposition. Once complete coverage with copper is obtained, the replicating film can be removed by dissolving in a solvent such as acetone. The foil is then ready for the subsequent deposition of the other membrane metal. It should be appreciated that because the supported membranes are so thin, homogenization can be readily obtained by annealing. It should also be appreciated that because the pores are so small, the stress in the supported membrane can be kept low, less than a few Mpa, even with thin supported membranes of 5 to 10 micrometer thick.

Generally, the supported membrane of the present invention is desirably used as a diaphragm in a reformer to separate hydrogen. In this use the supported membrane would have a thickness of between about 1 and 10 micrometer, more preferably at least about 6 micrometer. The time to sputter a film of particular thickness onto the parting material on the substrate will vary, depending on the efficiency of the equipment used and the operating conditions. For example, to make a 60/40 Pd/Cu film using an IonTech dual beam sputtering system, and a beam sputtering current of 70 mA, the deposition rate is about 1 micrometer per hour. Evaporation from a melt is significantly faster. It should be appreciated that other uses for the supported membrane would be apparent to those skilled in the art.

EXAMPLE

Two 60/40 Pd/Cu film samples 5~μm thick were produced in this example. One 60/40 Pd/Cu membrane was manufactured according to an embodiment of the present invention being sputtered at 6 mTorr of pressure with argon which provided an essentially stress-free deposited film. The second 60/40 Pd/Cu sample, a comparative sample, was produced by the successive evaporation under a pressure of <1 mTorr of layers of copper and palladium. This pressure did not produce an essentially stress-free deposited film.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A supported membrane for separation of hydrogen in a fuel cell comprising:

a microetched foil to form a substrate; and a membrane metal of a metal alloy deposited over said substrate to form a thin metal supported membrane having a thickness of between about one micrometer and ten micrometer for hydrogen separation.

2. A supported membrane as set forth in claim 1 wherein said microetched foil is a metal material.

3. A supported membrane as set forth in claim 2 wherein said metal material is stainless steel.

4. A supported membrane as set forth in claim 1 wherein said metal alloy includes either one of palladium and vanadium.

5. A supported membrane as set forth in claim 1 wherein said metal alloy comprises copper and either one of palladium and vanadium.

6. A supported membrane as set forth in claim 1 wherein said foil has a plurality of holes.

7. A supported membrane as set forth in claim 6 wherein said holes have a predetermined diameter of approximately 50 micrometer.

8. A supported membrane as set forth in claim 6 wherein said holes are spaced apart a predetermined distance of approximately 150 micrometer.

9. A supported membrane as set forth in claim 1 including a layer of replicating material attached to said foil.

10. A method of making a thin metal supported membrane useful as a diaphragm in fuel reformers for separating hydrogen from other gaseous products of a reforming reaction, said method comprising the steps of:

providing a substrate comprising a microetched foil; and depositing a membrane metal of a metal alloy onto the substrate to form a thin metal supported membrane having a thickness of between about one micrometer and ten micrometer for hydrogen separation.

11. A method as set forth in claim 10 including the step of coating the foil with a replicating material capable of being dissolved in a solvent to form the substrate.

12. A method as set forth in claim 11 including the step of subjecting the replicating material to the solvent to dissolve the replicating material.

13. A method as set forth in claim 11 including the step of applying the replicating material to the back of the foil.

14. A method as set forth in claim 11 wherein the replicating material is cellulose acetate.

15. A method as set forth in claim 10 wherein said step of depositing comprises sputtering the membrane metal onto the substrate.

16. A method as set forth in claim 10 wherein the metal alloy comprises copper and either one of palladium or vanadium.

17. A method as set forth in claim 10 wherein the foil is stainless steel.

18. A supported membrane of a metal alloy, useful as a diaphragm in fuel reformers for separating hydrogen from other gaseous products of a reforming reaction, made by a method which comprises the steps of:

providing a substrate comprising a microetched foil; and depositing a membrane metal of a metal alloy onto the substrate to form a thin metal supported membrane having a thickness of between about one micrometer and ten micrometer for hydrogen separation.

* * * * *